(12) United States Patent
Army, Jr. et al.

(10) Patent No.: US 9,683,678 B2
(45) Date of Patent: Jun. 20, 2017

(54) HEAT EXCHANGING VALVE ARRANGEMENT

(71) Applicant: HAMILTON SUNDSTRAND CORPORATION, Windsor Locks, CT (US)

(72) Inventors: Donald E. Army, Jr., Enfield, CT (US); Louis J. Bruno, Ellington, CT (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 0 days.

(21) Appl. No.: 14/825,925

(22) Filed: Aug. 13, 2015

(65) Prior Publication Data
US 2017/0045155 A1 Feb. 16, 2017

(51) Int. Cl.
| | | |
|---|---|---|
| *B64D 13/00* | (2006.01) | |
| *F16K 11/085* | (2006.01) | |
| *F01D 17/14* | (2006.01) | |
| *F16K 49/00* | (2006.01) | |

(52) U.S. Cl.
CPC ............ *F16K 49/007* (2013.01); *B64D 13/00* (2013.01); *F01D 17/145* (2013.01); *F16K 11/0853* (2013.01)

(58) Field of Classification Search
CPC ... F16K 49/007; F16K 11/0853; B64D 13/00; F01D 17/145
USPC ..... 137/338, 340, 339, 625.46, 625.47, 602; 137/605
See application file for complete search history.

(56) References Cited

U.S. PATENT DOCUMENTS

| | | | | |
|---|---|---|---|---|
| 916,611 | A | * 3/1909 | Schoettl | ............... A61L 2/07 137/625.19 |
| RE15,965 | E | * 12/1924 | Russell | ............... F16K 11/0853 137/315.03 |
| 1,708,273 | A | * 4/1929 | Larsen | ............... F16K 11/0833 137/312 |
| 3,411,538 | A | 11/1968 | Gruner et al. | |
| 3,960,167 | A | * 6/1976 | Ros | ............... F16K 5/0471 137/375 |

(Continued)

FOREIGN PATENT DOCUMENTS

| | | |
|---|---|---|
| DE | 19507919 A1 | 9/1996 |
| GB | 2279431 A | 4/1995 |

OTHER PUBLICATIONS

Extended European Search Report for Appln. No. 16183766.1-1754; Reference No. 65.129882; Date: Mar. 31, 2017; 9 pages.

*Primary Examiner* — John K Fristoe, Jr.
*Assistant Examiner* — Josephine Trinidad-Borges
(74) *Attorney, Agent, or Firm* — Cantor Colburn LLP

(57) ABSTRACT

A heat exchanging valve arrangement includes, a manifold defining a chamber, a first passageway, a second passageway, a third passageway, and a fourth passageway, and a member movable relative to the manifold configured to define fluidic communication between the first passageway and the second passageway when in a first position and between the first passageway and the third passageway when in a second position, fluid is flowable into the chamber through the fourth passageway such that fluid is exposed to surfaces of the member regardless of whether the member is in the first position or the second position.

14 Claims, 3 Drawing Sheets

(56) References Cited

U.S. PATENT DOCUMENTS

| | | | |
|---|---|---|---|
| 4,430,867 A * | 2/1984 | Warner | B60H 1/32 |
| | | | 62/172 |
| 5,461,882 A | 10/1995 | Zywiak | |
| 5,553,461 A | 9/1996 | Hitzigrath et al. | |
| 7,040,112 B2 | 5/2006 | Axe et al. | |
| 8,176,937 B2 * | 5/2012 | Zhang | F16K 11/074 |
| | | | 137/337 |
| 2013/0118191 A1 * | 5/2013 | Zywiak | B64D 13/06 |
| | | | 62/87 |
| 2015/0004011 A1 | 1/2015 | Army et al. | |

* cited by examiner

HEAT EXCHANGING VALVE ARRANGEMENT

BACKGROUND

Valve arrangements, such as diverter valves, for example, typically rely upon rotation of a member within a housing to realigned openings in the member with passageways in the housing to alter porting of fluids therethrough. These devices serve the purpose for which they were designed. Using such devices in harsh environments that they may not have originally been designed for may affect smooth operation thereof. Alterations to such devices to allow smooth operation in ever more harsh conditions may be of interest to those who practice in the art.

BRIEF DESCRIPTION

Disclosed herein is a heat exchanging valve arrangement that includes, a manifold defining a chamber, a first passageway, a second passageway, a third passageway, and a fourth passageway, and a member movable relative to the manifold configured to define fluidic communication between the first passageway and the second passageway when in a first position and between the first passageway and the third passageway when in a second position, fluid is flowable into the chamber through the fourth passageway such that fluid is exposed to surfaces of the member regardless of whether the member is in the first position or the second position.

In addition to one or more of the features described above, or as an alternative, further embodiments include: wherein the member has a first opening, a second opening and a third opening all in fluidic communication with one another and the first opening is aligned with the first passageway, the second opening is aligned with the second passageway and the third opening is aligned with the fourth passageway when the member is in the first position thereby providing fluidic communication between the first passageway and the second passageway through the first opening and the second opening; wherein the first opening is aligned with the fourth passageway, the second opening is aligned with the first passageway and the third opening is aligned with the third passageway when the member is in the second position, thereby providing fluidic communication between the first passageway and the third passageway through the second opening and the third opening; wherein the member defines an inside that fluidically connects the first opening, the second opening and the third opening to one another; wherein walls that define the first opening, the second opening and the third opening also define inner radial features of a plenum, and fluid flowing from the chamber are free to flow through the plenum; wherein fluid flows into the plenum through a first port and out of the plenum through a second port when the member is in the first position and fluid flows into the plenum through the second port and out of the plenum through the first port when the member is in the second position; wherein seals between the member and the manifold occlude fluid flowing in the chamber from commingling with fluid within the member; wherein the seals sealingly engage with both the manifold and the outer radial surface of the member whether the member is in the first position or the second position; wherein the member is rotatably movable relative to the manifold; wherein the member rotates through about 90 degrees of rotation between the first position and the second position; wherein heat transfer between fluid in the manifold and the member prevent freezing the member in one of the first position and the second position; wherein the heat exchanging valve arrangement is a turbine outlet diverter valve; wherein subfreezing turbine air flows in through the first passageway and flows overboard out through the second passageway when the member is in the first position and subfreezing turbine air flows in through the first passageway and into a cabin of an aircraft through the third passageway when the member is in the second position; and wherein the manifold is configured to port subfreezing air into the first passageway and warmed air into the fourth passageway.

Further disclosed herein is a heat exchanging valve arrangement. The arrangement includes, a manifold defining multiple passageways, and a member movably disposed within the manifold having an inside fluidically connecting at least three openings and walls defining the at least three openings separating the inside from a plenum also defined within the member, the member is movable between a first position and a second position relative to the manifold, the heat exchanging valve arrangement is also configured such that fluid can enter the inside through a first of the multiple passageways and one of the at least three openings when the member is in the first position and exist the inside through another of the at least three openings and another of the multiple passageways when the member is in the second position, and fluid flowing into the plenum from yet another of the multiple passageways is exposed to the walls prior to mixing with fluid exiting the inside.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Figure 1:
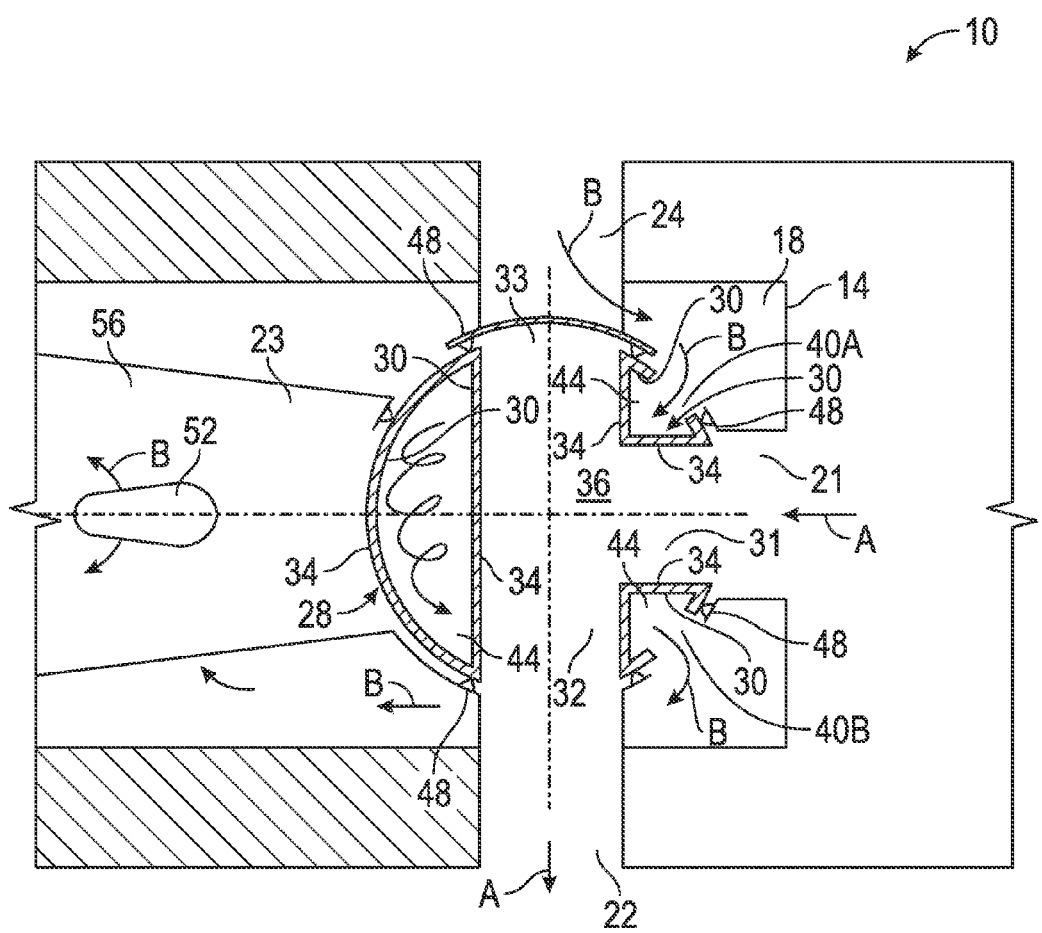
FIG. 1 depicts a side schematic view of a heat exchanging valve arrangement disclosed herein with a member shown in a first position.
Figure 2:
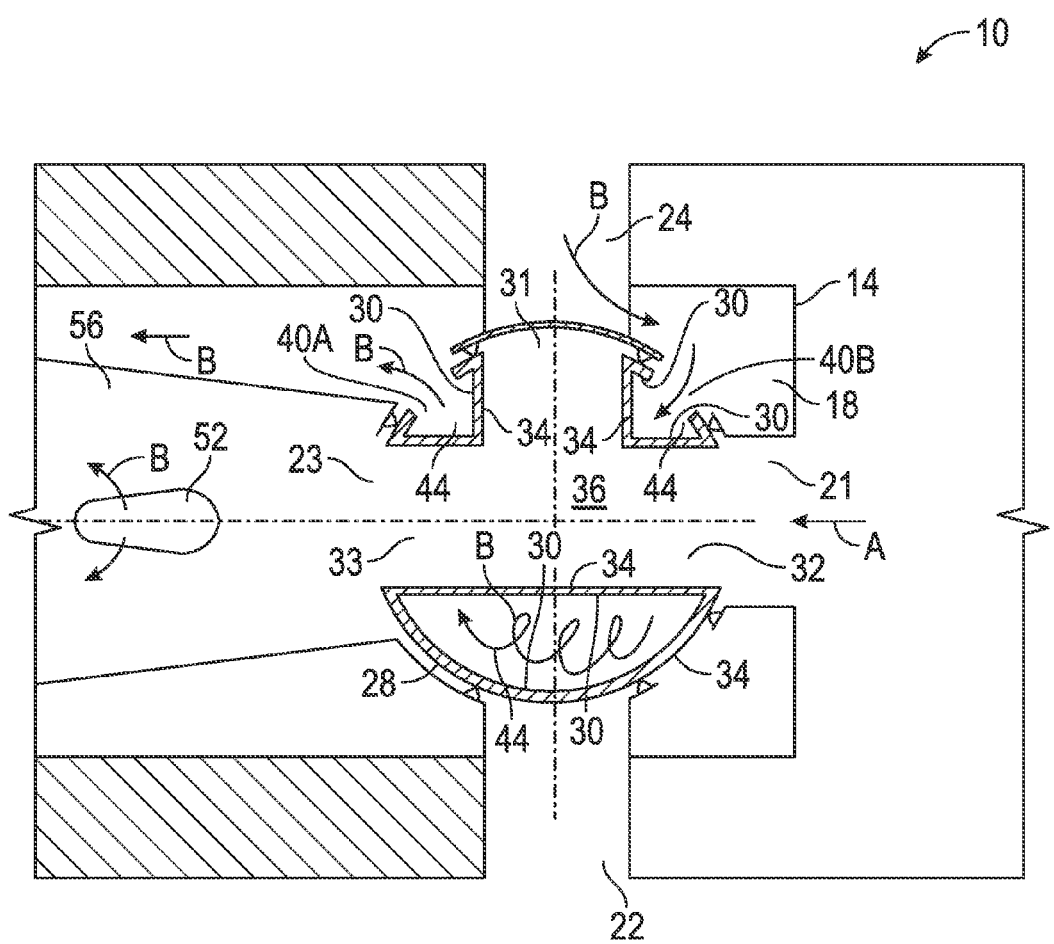
FIG. 2 depicts a side schematic view of the heat exchanging valve arrangement of FIG. 1 with the member shown in a second position.
Figure 3:
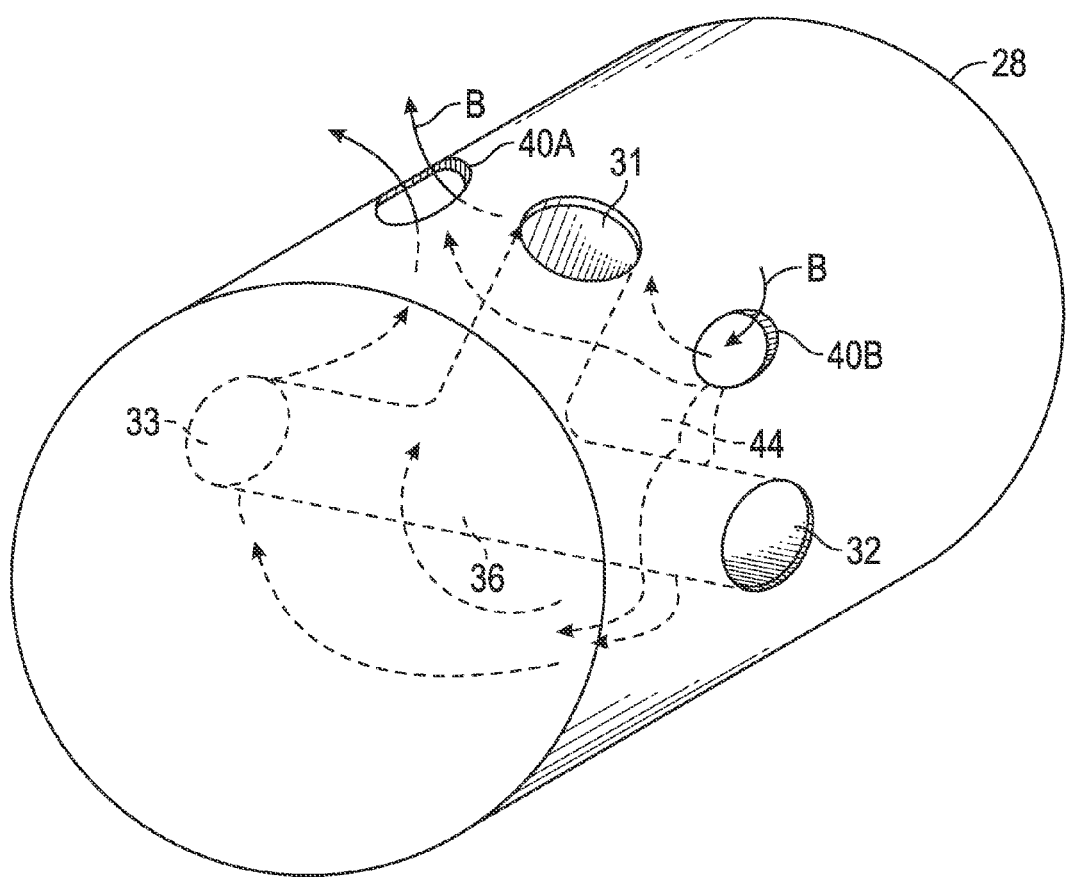
FIG. 3 depicts a perspective view of a member of the heat exchanging valve arrangement of FIG. 1.

Referring to FIGS. 1-3, an embodiment of a heat exchanging valve arrangement disclosed herein is schematically illustrated at 10. The arrangement 10 includes, a manifold 14 defining at least one chamber 18, a first passageway 21, a second passageway 22, a third passageway 23, and a fourth passageway 24. Also, a member 28 is movable relative to the manifold 14 and configured to define fluidic communication between the first passageway 21 and the second passageway 22 when in a first position (shown in FIG. 1) and between the first passageway 21 and the third passageway 23 when in a second position (shown in FIG. 2). In this embodiment the member 28 it rotatable relative to the manifold 14. Rotation of the member 28 through 90 degrees in a counterclockwise direction moves the member 28 from the first position to the second position and vice versa. Regardless of whether the member 28 is in the first position or the second position fluid is able to flow into the chamber 18 through the fourth passageway 24 such that fluid in the chamber 18 is exposed to surfaces 30 of walls 34 of the member 28 as will be discussed in more detail below.

The member 28 has at least a first opening 31, a second opening 32 and a third opening 33 that are all in fluidic communication with one another via an inside 36 of the member 28. When the member 28 is in the first position the first opening 31 is aligned with the first passageway 21, the second opening 32 is aligned with the second passageway 22 and the third opening 33 is aligned with the fourth passageway 24 thereby providing fluidic communication between the first passageway 21 and the second passageway 22 through the first opening 31 and the second opening 32.

Similarly, when the member 28 is in the second position the first opening 31 is aligned with the fourth passageway 24, the second opening 32 is aligned with the first passageway 21 and the third opening 33 is aligned with the third passageway 23 thereby providing fluidic communication between the first passageway 21 and the third passageway 23 through the second opening 32 and the third opening 33.

As mentioned above, fluid that flows in through the fourth passageway 24 into the chamber 18 can be exposed to the surfaces 30 of the walls 34 of the member 28. The walls 34 separate the inside 36 from a plenum 44 on an outside of the walls 34. Fluid from the fourth passageway 24 is able to flow into the plenum 44 through one of at least two ports 40A, 40B of the member 28, note just two of the ports 40A and 40B are illustrated in the embodiment in the Figures. When the member 28 is in the first position fluid flows into the plenum 44 through the port 40A, then through the plenum 44, is exposed to the surfaces 30, and exits the plenum 44 through the other port 40B. When the member 28 is in the second position the flow through the ports 40A, 40B is reversed and flow into the plenum 44 is through the port 40B and out through the port 40A.

The exposure of the surfaces 30 to the fluid allows heat to be transferred between the fluid and the member 28. In situations wherein the fluid is above freezing, such heat transfer can prevent water from freezing between the member 28 and the manifold 14 that could lock the member 28 by requiring more force to move the member 28 between the first position and the second position. In an application wherein the heat exchanging valve 10 is a turbine outlet diverter valve flow through the inside 36 may be from an outlet of a turbine and be below freezing temperature, while flow into the fourth passageway 24 may be air from a cabin of an aircraft that is warmer than freezing. The paths for the warmed cabin air is able to circulate through the plenum 44 and warm the walls 34 thereby preventing freezing of any water that may be present thereby avoiding locking movement of the member 28.

Seals 48 sealingly engage with both the manifold 14 and the member 28 whether the member 28 is in the first position or the second position. The seals 48 prevent fluid in the chamber 18 from commingling with fluid at the inside 36 of the member 28. One or more holes 52 located downstream from the chamber 18 (and the plenum 44 when the member 28 is in the first position) allows the fluid flowing into the chamber 18 from the fourth passageway 24 to flow into a downstream portion 56 of the third passageway 23 and in the process to comingle with fluid within the downstream portion 56.

Referring to FIG. 3, a perspective view of an embodiment of the member 28 disclosed herein is illustrated to help visualize its shape. Although the member 28 in this embodiment is cylindrical in shape, other embodiments could have alternate shapes, including spherical, for example.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

The invention claimed is:

1. A heat exchanging valve arrangement, comprising:
   a manifold defining a chamber, a first passageway, a second passageway, a third passageway, and a fourth passageway; and
   a member movable relative to the manifold, the member including an inside configured to define fluidic communication between the first passageway and the second passageway when in a first position and between the first passageway and the third passageway when in a second position, the member additionally including a plenum separate from said inside, the plenum being arranged in fluidic communication with the chamber, wherein fluid is flowable into the chamber through the fourth passageway such that fluid is exposed to surfaces of the member and fluid within the chamber is free to flow through the plenum regardless of whether the member is in the first position or the second position;
   wherein fluid flows into the plenum through a first port and out of the plenum through a second port when the member is in the first position and fluid flows into the plenum through the second port and out of the plenum through the first port when the member is in the second position.

2. The heat exchanging valve arrangement of claim 1, wherein the member has a first opening, a second opening and a third opening all in fluidic communication with one another and the first opening is aligned with the first passageway, the second opening is aligned with the second passageway and the third opening is aligned with the fourth passageway when the member is in the first position thereby providing fluidic communication between the first passageway and the second passageway through the first opening and the second opening.

3. The heat exchanging valve arrangement of claim 2, wherein the first opening is aligned with the fourth passageway, the second opening is aligned with the first passageway and the third opening is aligned with the third passageway when the member is in the second position, thereby providing fluidic communication between the first passageway and the third passageway through the second opening and the third opening.

4. The heat exchanging valve arrangement of claim 2, wherein the member defines an inside that fluidically connects the first opening, the second opening and the third opening to one another.

5. The heat exchanging valve arrangement of claim 4, wherein walls that define the first opening, the second opening and the third opening also define inner radial features of plenum.

6. The heat exchanging valve arrangement of claim 1, wherein seals between the member and the manifold occlude fluid flowing in the chamber from commingling with fluid within the member.

7. The heat exchanging valve arrangement of claim 4, wherein the seals sealingly engage with both the manifold and the outer radial surface of the member whether the member is in the first position or the second position.

8. The heat exchanging valve arrangement of claim 1, wherein the member is rotatably movable relative to the manifold.

9. The heat exchanging valve arrangement of claim 1, wherein the member rotates through about 90 degrees of rotation between the first position and the second position.

10. The heat exchanging valve arrangement, of claim 1 wherein heat transfer between fluid in the manifold and the member prevent freezing the member in one of the first position and the second position.

11. The heat exchanging valve arrangement of claim 1, wherein the heat exchanging valve arrangement is a turbine outlet diverter valve.

12. The heat exchanging valve arrangement of claim 1, wherein when the heat exchanging valve arrangement is configured for use on an aircraft, subfreezing turbine air flows in through the first passageway and flows overboard out through the second passageway when the member is in the first position and subfreezing turbine air flows in through the first passageway and into a cabin of the aircraft through the third passageway when the member is in the second position.

13. The heat exchanging valve arrangement of claim 1, wherein the manifold is configured to port subfreezing air into the first passageway and warmed air into the fourth passageway.

14. A heat exchanging valve arrangement, comprising:
a manifold defining multiple passageways; and
a member movably disposed within the manifold having an inside fluidically connecting at least three openings and walls defining the at least three openings separating the inside from a plenum also defined within the member, the member being movable between a first position and a second position relative to the manifold, the heat exchanging valve arrangement being configured such that fluid can enter the inside through a first of the multiple passageways and one of the at least three openings when the member is in the first position and exits the inside through another of the at least three openings and another of the multiple passageways when the member is in the second position, and fluid flowing into the plenum through a first port when the member is in the first position and fluid flow into the plenum through a second port when then member is in the second position, the fluid flowing through the plenum being exposed to the walls prior to mixing with fluid exiting the inside.

* * * * *